(12) United States Patent
Yao et al.

(10) Patent No.: US 11,004,261 B2
(45) Date of Patent: May 11, 2021

(54) METHOD, DEVICE, COMPUTER SYSTEM, AND MOBILE APPARATUS FOR GENERATING THREE-DIMENSIONAL POINT CLOUD

(71) Applicant: SZ DJI TECHNOLOGY CO., LTD., Shenzhen (CN)

(72) Inventors: Yao Yao, Shenzhen (CN); Kaiyong Zhao, Shenzhen (CN); Shizhen Zheng, Shenzhen (CN); Cihui Pan, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 71 days.

(21) Appl. No.: 16/413,313

(22) Filed: May 15, 2019

(65) Prior Publication Data

US 2019/0266792 A1    Aug. 29, 2019

Related U.S. Application Data

(63) Continuation of application No. PCT/CN2016/106104, filed on Nov. 16, 2016.

(51) Int. Cl.
*G06K 9/00* (2006.01)
*G06T 17/00* (2006.01)
*G06T 7/593* (2017.01)

(52) U.S. Cl.
CPC .............. *G06T 17/00* (2013.01); *G06T 7/593* (2017.01); *G06T 2207/10028* (2013.01)

(58) Field of Classification Search
CPC ......... G06T 7/00; G06T 7/593; G06T 7/0075; G06T 7/0022; G06T 2207/10028; G06T 2207/10012; H04N 13/0239; H04N 13/0082; H04N 9/045; H04N 7/193; H04N 7/047; H04N 7/107; H04N 2201/04703
See application file for complete search history.

(56) References Cited

U.S. PATENT DOCUMENTS

| | | | |
|---|---|---|---|
| 8,179,393 B2 * | 5/2012 | Minear | G06T 7/30 345/419 |
| 8,488,877 B1 * | 7/2013 | Owechko | G06K 9/00704 382/165 |
| 9,141,852 B1 * | 9/2015 | Cosgun | G08B 6/00 |
| 9,165,383 B1 * | 10/2015 | Mendez-Rodriguez | G01S 7/51 |

(Continued)

FOREIGN PATENT DOCUMENTS

| CN | 102435188 A | 5/2012 |
|---|---|---|
| CN | 104599314 A | 5/2015 |

(Continued)

OTHER PUBLICATIONS

William Oberle and Lawrence Davis, Toward High Resolution, Ladar-Quality 3-D World Models Using Ladar-Stereo Integration and Fusion, Army Research Laboratory, Feb. 2005.

(Continued)

*Primary Examiner* — Amir Alavi
(74) *Attorney, Agent, or Firm* — Anova Law Group, PLLC

(57) ABSTRACT

A method of generating a three-dimensional point cloud includes obtaining a plurality of image data sources through a plurality of sensors, and performing fusion processing according to the plurality of image data sources to obtain the three-dimensional point cloud.

18 Claims, 5 Drawing Sheets

(56) References Cited

U.S. PATENT DOCUMENTS

| | | | |
|---|---|---|---|
| 9,286,538 B1* | 3/2016 | Chen | G06T 11/003 |
| 9,383,753 B1* | 7/2016 | Templeton | G01S 17/42 |
| 9,761,002 B2* | 9/2017 | Mundhenk | G06T 7/593 |
| 9,972,067 B2* | 5/2018 | Kwon | G06T 3/0068 |
| 10,365,650 B2* | 7/2019 | Rust | G05D 1/0272 |
| 10,663,594 B2* | 5/2020 | Tsishkou | G01S 17/931 |
| 2019/0266792 A1* | 8/2019 | Yao | G06T 17/00 |

FOREIGN PATENT DOCUMENTS

| | | |
|---|---|---|
| CN | 104903677 A | 9/2015 |
| CN | 105261060 A | 1/2016 |
| CN | 105869167 A | 8/2016 |
| CN | 106056664 A | 10/2016 |
| EP | 2833322 A1 | 2/2015 |
| KR | 20140134043 A | 11/2014 |

OTHER PUBLICATIONS

Can Wang, Research on Weed Identification System Based on Binocular Vision, Full-Time Master's Thesis, Shanxi Agricultural University, Jun. 2015, p. 9. (Machine Translation Included).

Hao Wu et al., Map Building of Indoor Unknown Environment Based on Robot Service Mission Direction, ROBOT, vol. 32, No. 2, Mar. 2010, pp. 196-203.

Shaopeng Wei et al., Disparity Estimation Based on the Combination of Depth Camera and Stereo Vision, Opto-Electronic Engineering, Jul. 2015, vol. 42, No. 7, China.

World Intellectual Property Organization (WIPO) International Search Report for PCT/CN2016/106104 dated May 31, 2017 5 Pages.

* cited by examiner

METHOD, DEVICE, COMPUTER SYSTEM, AND MOBILE APPARATUS FOR GENERATING THREE-DIMENSIONAL POINT CLOUD

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCE TO RELATED APPLICATION

This application is a continuation application of International Application No. PCT/CN2016/106104, filed on Nov. 16, 2016, the entire contents of which are incorporated herein by reference.

TECHNICAL FIELD

The present disclosure relates to the field of information technology and, more particularly, to a method, a device, a computer system, and a mobile apparatus for generating a three-dimensional point cloud.

BACKGROUND

Three-dimensional point clouds have broad applications in three-dimensional modeling, automatic driving, robot simultaneous localization and mapping (SLAM), and other areas.

In the conventional technologies for generating a three-dimensional point cloud, usually a sensor such as a camera is used to collect an image data source, and then fusion processing is performed to obtain the three-dimensional point cloud. However, in the conventional technologies, a processing speed may be relatively low, or the 3-dimensional point cloud may have a relatively low quality.

SUMMARY

In accordance with the disclosure, there is provided a method of generating a three-dimensional point cloud. The method includes obtaining a plurality of image data sources through a plurality of sensors, and performing fusion processing according to the plurality of image data sources to obtain the three-dimensional point cloud.

Also in accordance with the disclosure, there is provided a mobile apparatus including a plurality of sensors and a processor. The plurality of sensors are configured to obtain a plurality of image data sources. The processor is configured to perform fusion processing according to the plurality of image data sources to obtain a three-dimensional point cloud.

DETAILED DESCRIPTION OF THE EMBODIMENTS

Technical solutions of the present disclosure will be described with reference to the drawings. It will be appreciated that the described embodiments are part rather than all of the embodiments of the present disclosure. Other embodiments conceived by those having ordinary skills in the art on the basis of the described embodiments without inventive efforts should fall within the scope of the present disclosure.

Exemplary embodiments will be described with reference to the accompanying drawings, in which the same numbers refer to the same or similar elements unless otherwise specified.

Unless otherwise defined, all the technical and scientific terms used herein have the same or similar meanings as generally understood by one of ordinary skill in the art. As described herein, the terms used in the specification of the present disclosure are intended to describe exemplary embodiments, instead of limiting the present disclosure. The term "and/or" used herein includes any suitable combination of one or more related items listed.

It is to be understood that in the various embodiments of the present disclosure, numbers associated with processes do not represent the order of execution of the processes. The order of execution of the processes may be determined according to their functions and intrinsic logic, without restricting implementations of embodiments of the present disclosure.

The present disclosure provides a technical solution for generating a 3-dimensional (3D) point cloud. The technical solution may have applications in various apparatuses having processing functions, e.g., a computer system or a mobile apparatus with a processing function. The mobile apparatus may include, for example, a drone, i.e., an unmanned aerial vehicle, an unmanned vessel, or a robot, which is not restricted in the present disclosure.

Figure 1:
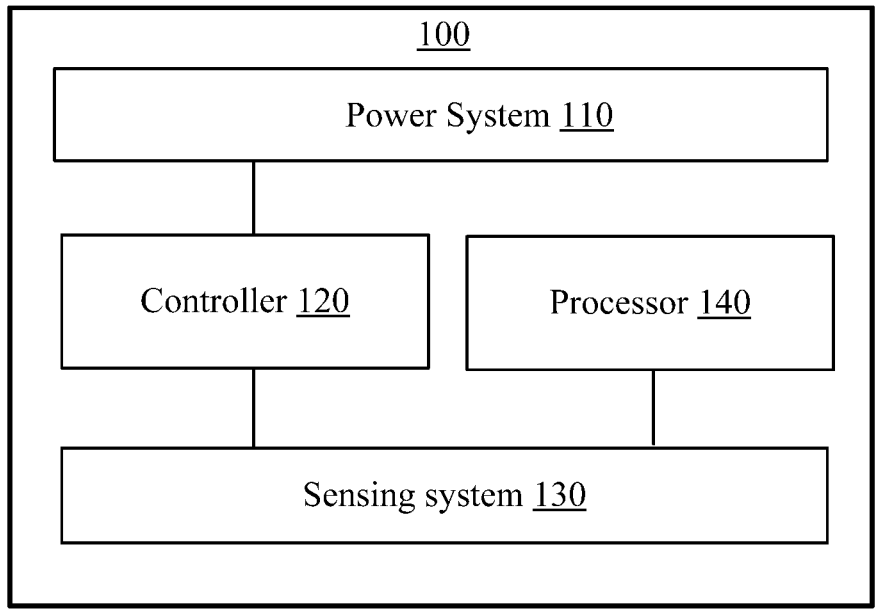
FIG. 1 illustrates a block diagram of an exemplary mobile apparatus according to various disclosed embodiments of the present disclosure.

FIG. 1 illustrates a block diagram of an exemplary mobile apparatus 100 according to various disclosed embodiments of the present disclosure.

As shown in FIG. 1, the mobile apparatus 100 includes a power system 110, a controller 120, a sensing system 130, and a processor 140.

The power system 110 may be configured to power the mobile apparatus 100.

For example, a power system of a drone may include an electron speed regulator, a propeller, and a motor corresponding to the propeller. The motor may be coupled to the electronic speed regulator and the propeller, and arranged between the electronic speed regulator and the propeller. The motor and the propeller may be arranged on a corresponding arm. The electronic speed regulator may be configured to receive a driving signal generated by a controller and to provide a driving current to the motor according to the driving signal, such that a motor rotating speed may be controlled. The motor may be configured to drive the propeller, such that the propeller may rotate, thus providing power for a flight of the drone.

The sensing system 130 may be configured to measure attitude information of the mobile apparatus 100, i.e., position information and/or status information of the mobile apparatus 100 in real space, e.g., a three-dimensional (3D) position, a 3D angle, a 3D velocity, a 3D acceleration, a 3D angular velocity, etc. of the mobile apparatus 100. The sensing system 130 may include, for example, at least one of a gyroscope, an electronic compass, an inertial measurement unit (IMU), a vision sensor, a global positioning system (GPS), an air pressure gauge, an airspeed meter, or another sensor.

In some embodiments, the sensing system 130 may also include a plurality of sensors for collecting data, e.g., a plurality of sensors for obtaining a plurality of image data sources, such as a depth camera, a binocular camera, a monocular camera, a position angle sensor, or the like. The position angle sensor can be used to obtain a position and an attitude of the corresponding camera.

The controller 120 may be configured to control a movement of the mobile apparatus 100. The controller 120 may control the mobile apparatus 100 according to a preset program instruction. For example, the controller 120 may control the movement of the mobile apparatus 100 according to the attitude information of the mobile apparatus 100 measured by the sensing system 130. The controller 120 may also control the mobile apparatus 100 according to a control signal from a remote controller.

The processor 140 may process data collected by the sensing system 130. For example, the processor 140 may process a plurality of image data sources obtained by a plurality of sensors to obtain a 3D point cloud.

The above-described division and naming of the components of the mobile apparatus 100 are merely exemplary and do not limit the scope of the present disclosure.

Further, the mobile apparatus 100 may also include other components not shown in FIG. 1, which are not restricted in the present disclosure.

Further, the processor that processes a plurality of image data sources may also include one or more separate devices. That is, the processor that processes the plurality of image data sources can include one or more components arranged in the mobile apparatus, and/or one or more components separate from the mobile apparatus.

Figure 2:
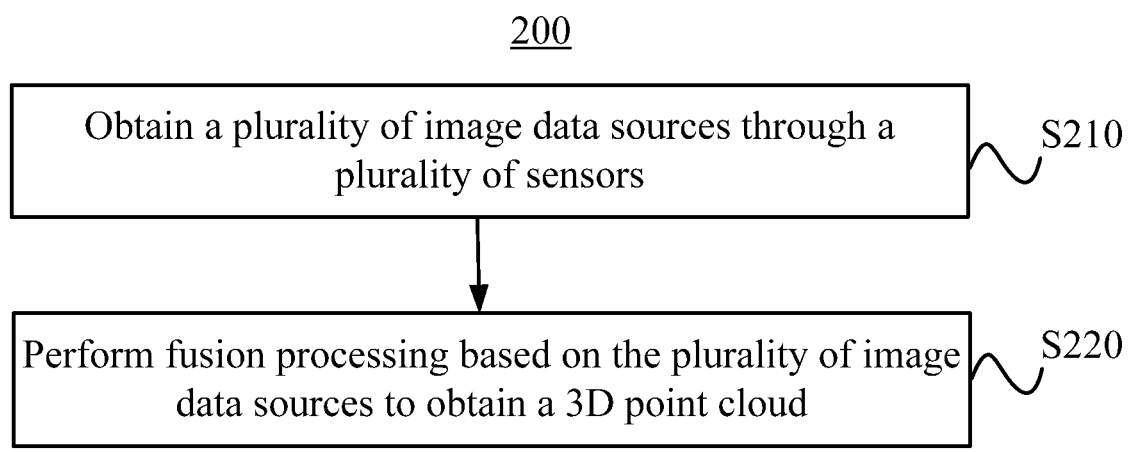
FIG. 2 illustrates a flow chart of an exemplary method for generating a 3-dimensional (3D) point cloud according to various disclosed embodiments of the present disclosure.

FIG. 2 illustrates a flow chart of an exemplary method 200 for generating a 3D point cloud according to various disclosed embodiments of the present disclosure. The method 200 may be performed by, for example, a computer system or a mobile apparatus, e.g., the mobile apparatus 100 shown in FIG. 1.

With reference to FIG. 2, the method 200 is described below.

At S210, a plurality of image data sources are obtained through a plurality of sensors.

At S220, fusion processing is performed based on the plurality of image data sources to obtain a 3D point cloud.

In the embodiments of the present disclosure, a three-dimensional point cloud may be generated using a plurality of image data sources. Compared to the conventional technologies in which only a single image data source is used, a method consistent with the disclosure has a larger amount of data because multiple image data sources are used. Further, the plurality of image data sources may refer to each other in the fusion processing, such that an efficiency of generating the 3D point cloud can be improved.

In some embodiments, the plurality of sensors may include at least two of a depth camera, a binocular camera, a monocular camera, or a position angle sensor. The depth camera, binocular camera, and monocular camera can obtain depth data sources. The position angle sensor can obtain a camera position and attitude data source, i.e., a data source for both camera position information and camera attitude information.

In some embodiments, the depth camera may include one or more of a structured-light depth camera, e.g., kinect, or a time-of-flight (ToF) camera.

The structured-light depth camera may emit infrared laser that may reach a surface of an object, also referred to as an "object surface," after being reflected by a diffuse reflection surface or passing through a scatterer, and may interfere to form speckles. For each direction, the speckles on the object surfaces at different distances may be different. The structured-light depth camera, e.g., Kinect, may capture a speckle through an infrared camera and compare the captured speckle with reference speckle patterns having pre-calibrated depths to obtain the object distance corresponding to the speckle.

The ToF cameras may include a pulsed or continuously modulated light source and a periodically exposed camera to measure a time difference between a moment when light exits the light source and another moment when the camera receives the light, such that the depth information may be obtained.

For the binocular camera, a relative position and an angular separation of the two cameras of the binocular camera may be configured or known in advance. Further, two images, e.g., two images captured by the two cameras, may have relatively large overlapping regions. After matching, for an object not too far away from the two cameras, depth information may be obtained according to an angle formed by two directions from a point on the object to the two cameras.

The monocular camera may perform multi-angle shooting, i.e., image capturing at multiple angles, on the object to obtain a plurality of images and then extract features. Further, the features in the plurality of images may be matched to determine camera parameters, e.g., orientations, and generate a point cloud model of the object.

The position angle sensor may be used to obtain a position and an attitude of the corresponding camera, and may include one of various types of position angle sensors.

In the present disclosure, based on the plurality of image data sources obtained by the plurality of sensors, fusion processing may be performed to obtain a 3D point cloud.

Figure 3:
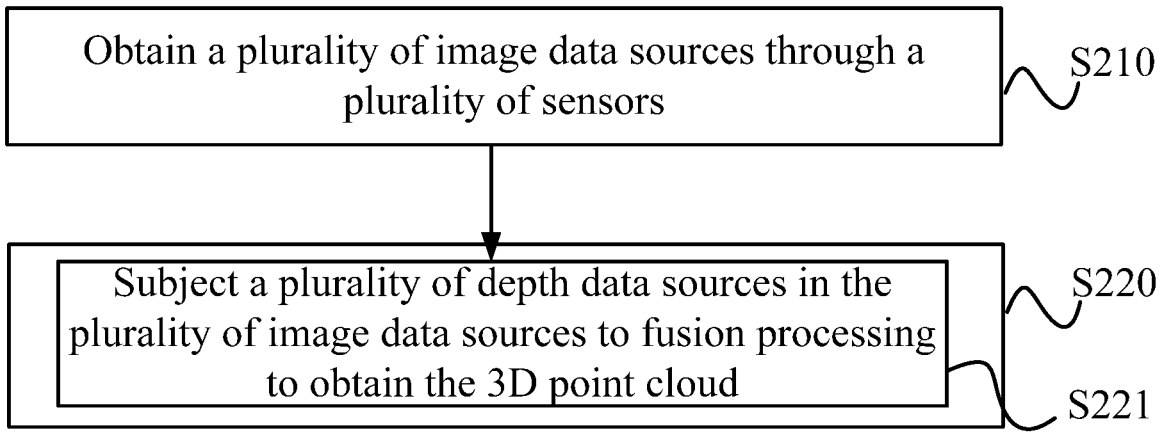
FIG. 3 illustrates a flow chart of another exemplary method for generating a 3D point cloud according to various disclosed embodiments of the present disclosure.

FIG. 3 illustrates a flow chart of another exemplary method 300 for generating a 3D point cloud according to various disclosed embodiments of the present disclosure.

The method 300 is similar to the method 200, except that in the method 300, performing fusion processing based on the plurality of image data sources to obtain the 3D point cloud (S220 in FIG. 2) includes subjecting a plurality of depth data sources in the plurality of image data sources to the fusion processing to obtain the 3D point cloud (S221 in FIG. 3).

In some embodiments, the depth data sources may be subject to fusion processing to obtain the 3D point cloud. For example, the fusion processing may generally include processes described below.

At S31, certain points in depth data, e.g., a depth image, are selected. The manner of selecting points in the depth data is not restricted, and may include, for example, a total selection, random sampling, uniform sampling, feature point extraction, or another suitable selection manner.

At S32, matching and screening are performed. Various manners can be used to perform matching and screening, including, for example, matching point sets in two depth images adjacent in time, or matching a current depth image with a point cloud model constructed based on previous images.

The position and attitude of the camera may be obtained after matching. In some embodiments, the position and attitude can be obtained via iteration as described below.

At S32*a*, a camera position and a camera attitude are adjusted.

At S32*b*, matching qualities of the points are calculated.

At S32*c*, points that have relatively low qualities are removed, i.e., data screening.

At S32*d*, an overall matching quality is calculated.

At S32*e*, the processes are repeated from S32*a*.

The overall matching quality may be optimized through a plurality of iterations.

At S33, after the matching is completed, two-dimensional (2D) points in the new depth images are converted into 3D points in the 3D space according to the camera position and the camera attitude, and are added to the point cloud model.

As described above, fusion processing may be performed according to a plurality of depth data sources. For example, point matching and screening operations may be performed according to the plurality of depth data sources. That is, point matching and screening may be performed using depth images from a plurality of sources, and obtained points may be added to a same 3D point cloud. Fusion processing of the plurality of depth data sources may include the above-described processes. The data screening may be performed at S32*c*. Due to a larger amount of data, it is easier to identify defect points, i.e., points having low matching qualities.

Figure 4:
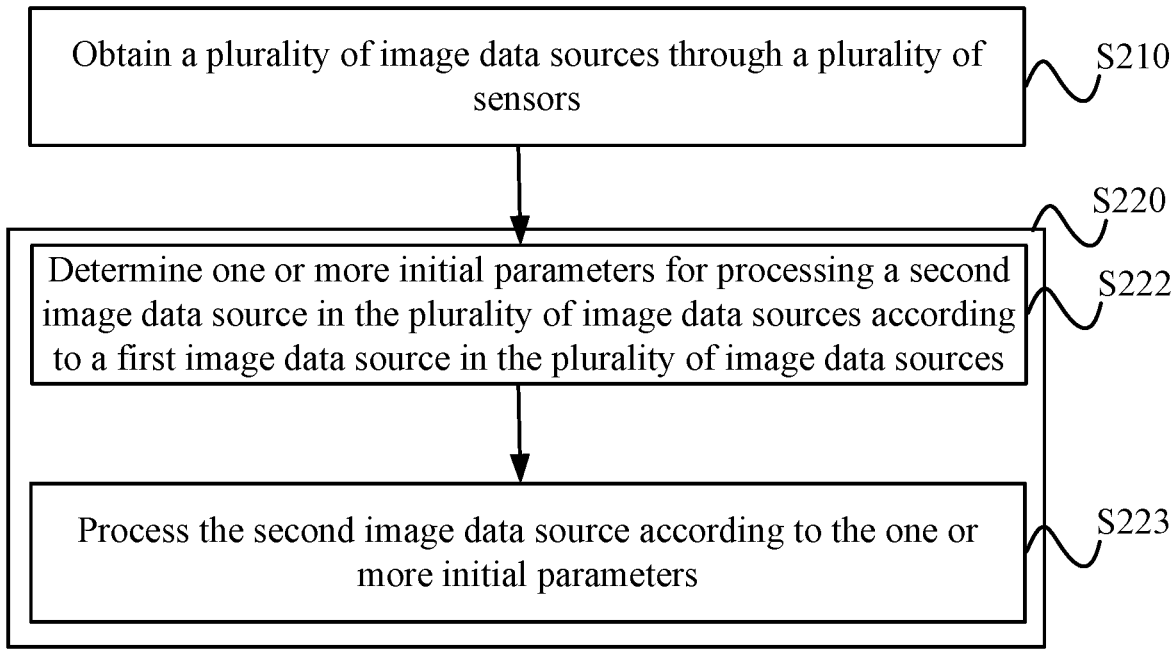
FIG. 4 illustrates a flow chart of another exemplary method for generating a 3D point cloud according to various disclosed embodiments of the present disclosure.

FIG. 4 illustrates a flow chart of another exemplary method 400 for generating a 3D point cloud according to various disclosed embodiments of the present disclosure. The method 400 is similar to the method 200, except that in the method 400, performing fusion processing based on the plurality of image data sources to obtain the 3D point cloud (S220 in FIG. 2) includes determining, according to a first image data source in the plurality of image data sources, one or more initial parameters for processing a second image data source in the plurality of image data sources (S222 in FIG. 4), and processing the second image data source according to the one or more initial parameters (S223 in FIG. 4).

In some embodiments, because the plurality of image data sources are used, the plurality of image data sources can reference to each other during the fusion processing. For example, one or more initial parameters for processing the second image data source may be determined according to the first image data source; and the second image data source may be processed according to the one or more initial parameters. Accordingly, the initial parameters may be closer to the true values, such that the 3D point cloud can be generated more quickly and accurately.

In some embodiments, the first image data source may include an image data source obtained by a depth camera, and the second image data source may include an image data source obtained by a binocular camera. In these embodiments, an initial feature point correspondence for processing the image data source obtained by the binocular camera can be determined based on the image data source obtained by the depth camera.

For example, the binocular camera may obtain two images at a same time, matching the two images may be needed to obtain depth data. The processes for matching the two images are described below.

At S41, feature points are extracted from the two images separately.

At S42, the feature points of the two images are compared to determine a correspondence between the feature points of the two images.

At S43, parallaxes are calculated.

At S44, depths are calculated.

If data from the depth camera is available as reference, an initial feature point correspondence may be obtained by performing processes S44, S43, and S42 in this order.

In some embodiments, the depths of the feature points are determined based on the image data source obtained by the depth camera.

Parallaxes of the feature points with respect to the binocular camera are determined according to the depths of the feature points.

An initial feature point correspondence is determined according to the parallaxes of the feature points with respect to the binocular camera.

That is, a parallax is calculated based on data obtained by the depth camera, and then an offset of the corresponding points in the two images obtained by the binocular camera is further calculated to obtain a rough correspondence, i.e., the initial feature point correspondence.

After the initial feature point correspondence is determined, the correspondence of the feature points of the two images obtained by the binocular camera is determined according to the initial feature point correspondence.

Parallax information is determined according to the correspondence of the feature points of the two images, Depth information is determined according to the parallax information.

A 3D point cloud is generated according to the depth information.

In some embodiments, an approximate feature point correspondence may be known. Accordingly, a matching degree of the corresponding points may be maximized by slightly adjusting an offset when the feature points are matched to obtain the correspondence of the feature points of the two images. Then, the above-described processes S43 and S44 may be performed to obtain more accurate parallax and depth data, and then generate the 3D point cloud.

Thus, according to the image data source obtained by the depth camera, the initial feature point correspondence for processing the image data source that is obtained by the binocular camera may be determined, and the 3D point cloud may be generated more quickly and more accurately.

In some embodiments, the first image data source may include a camera position and attitude data source, and the second image data source may include a depth data source. In these embodiments, initial camera position and attitude for performing fusion processing on the depth data source can be determined according to the camera position and attitude data source.

In the process of generating 3D point cloud, the camera position and attitude may need to be determined. In some embodiments, the initial camera position and attitude data may be provided using the camera position and attitude data source, thereby simplifying and accelerating the processing and improving the accuracy of the result.

In some embodiments, the camera position and attitude corresponding to the depth data in the depth data source may be determined according to the initial camera position and attitude. According to the determined camera position and attitude, depth data in the depth data source may be subject to fusion processing to obtain a 3D point cloud.

In some embodiments, an aspect of the fusion processing on the depth data may be related to the camera's position and attitude. That is, through optimizing the camera position and attitude, a degree of surface matching between the current depth data and the point cloud model may be maximized. In some embodiments, an iterative method may be used. For example, a degree of matching may be calculated based on an initial value of camera position and attitude, and the coordinates and attitude may be adjusted, such that the degree of matching may be maximized. For this optimizing algorithm, if the initial value is closer to an optimal value, the optimization process may converge after a small number of iterations. If the initial value is provided by guessing, the optimization process may fall into a local minimum, resulting in, for example, optimization failure and further matching failure. In contrast, consistent with embodiments of the disclosure, the camera position and attitude data source can provide the initial camera position and attitude as the initial value. The initial camera position and attitude may come from the position angle sensor, and thus may be closer to the true value, i.e., the optimum value. Accordingly, the initial camera position and attitude can be used to speed up the optimization process, thereby improving the processing efficiency.

In some embodiments, the first image data source may include a camera position and attitude data source, and the second image data source may include an image data source obtained by a monocular camera. In these embodiments, initial camera position and attitude for performing point cloud modeling on the image data source obtained by the monocular camera can be determined according to the camera position and attitude data source. Further, according to the initial camera position and attitude, the image data source obtained by the monocular camera may be used to construct the point cloud model.

In some embodiments, the initial camera position and attitude for performing the point cloud modeling on the image data source obtained by the monocular camera may be provided using the camera position and attitude data source.

When the monocular camera is used for point cloud modeling, i.e., constructing a point cloud model, the fusion algorithm may be relatively complicated because depth data are not obtained in advance. During model construction, the depth data may be coupled to the camera position and attitude. During matching, the feature points may need to be extracted, matched feature points in the two images may be identified, and then camera's position and attitude may be calculated according to the positions of the matched feature points. The camera position and attitude may be inaccurate due to the possible mismatched feature points. Consistent with embodiments of the present disclosure, the camera position and attitude can be obtained from another sensor, and then approximate positions of the corresponding points of the feature points in the current image may be calculated according to the previously obtained partial point cloud model. Accordingly, a matching accuracy may be ensured, and a modeling quality may be improved.

In some embodiments, the initial camera position and attitude may be provided using the camera position and attitude data source. Further, the point cloud model may be constructed using the image data source obtained by the monocular camera according to the initial camera position and attitude. The initial camera position and attitude may be from the position angle sensor, and thus may be closer to the true value. Accordingly, the initial camera position and attitude can be used to improve an accuracy of feature point matching during point cloud modeling, thereby improving an efficiency in generating the 3D point cloud.

The present disclosure further provides a computer system, and a device and a mobile apparatus for generating a 3D point cloud, as described below.

Figure 5:
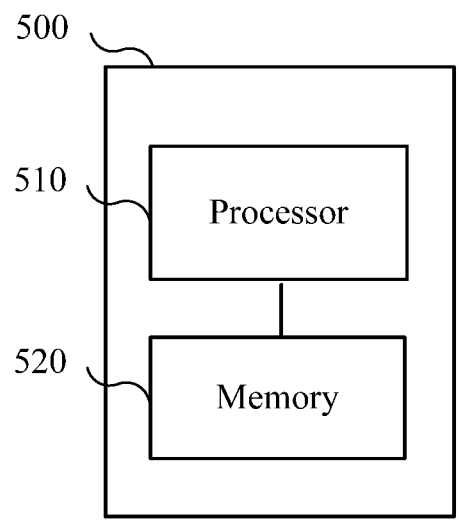
FIG. 5 illustrates a block diagram of an exemplary computer system according to various disclosed embodiments of the present disclosure.

FIG. 5 illustrates a block diagram of an exemplary computer system 500 according to various disclosed embodiments of the present disclosure.

As shown in FIG. 5, the computer system 500 includes a processor 510 and a memory 520.

In some embodiments, the computer system 500 may further include other components, e.g., input and output devices, communication interfaces, or the like, which are not restricted in the present disclosure.

The memory 520 is used to store computer-executable instructions.

The memory 520 may include one of a plurality of types of memory, such as a high-speed random access memory (RAM) or a non-volatile memory, e.g., a magnetic disk, which are not restricted in the present disclosure.

The processor 510 is configured to access the memory 520 and execute the computer-executable instructions to perform the operations in a method of generating a 3D point cloud according to embodiments of the present disclosure, such as one of the above-described exemplary embodiments.

The processor 510 may include a microprocessor, a field programmable gate array (FPGA), a central processing unit (CPU), a graphics processing unit (GPU), or the like, which is not restricted in the present disclosure.

Figure 6:
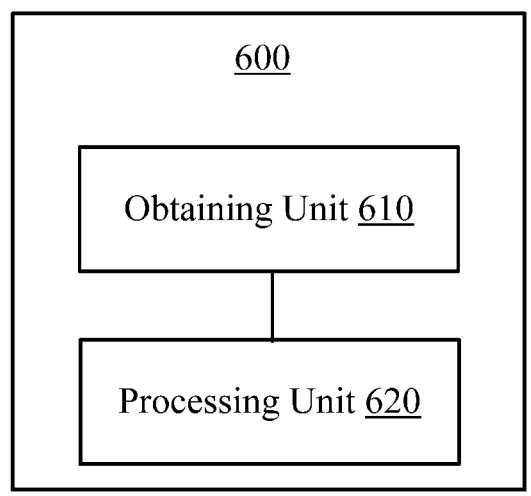
FIG. 6 illustrates a block diagram of an exemplary device for generating a 3D point cloud according to various disclosed embodiments of the present disclosure.

FIG. 6 illustrates a block diagram of an exemplary device 600 for generating a 3D point cloud according to various disclosed embodiments of the present disclosure. The device 600 may perform a method for generating a 3D point cloud consistent with the present disclosure, e.g., one of the above-described exemplary methods for generating a 3D point cloud.

As shown in FIG. 6, the device 600 includes an obtaining unit 610 configured to obtain a plurality of image data sources through a plurality of sensors, and a processing unit 620 configured to perform fusion processing based on the plurality of image data sources to obtain a 3D point cloud.

In the embodiments of the present disclosure, a three-dimensional point cloud may be generated using a plurality of image data sources. Compared to the conventional technologies in which only a single image data source is used, a method consistent with the disclosure has a larger amount of data because multiple image data sources are used. Further, the plurality of image data sources may reference each other in the fusion processing, such that an efficiency of generating the 3D point cloud can be improved.

In some embodiments, the plurality of sensors may include at least two of a depth camera, a binocular camera, a monocular camera, or a position angle sensor.

In some embodiments, the processing unit 620 may be configured to perform fusion processing on a plurality of depth data sources in the plurality of image data sources to obtain the 3D point cloud.

In some embodiments, the processing unit 620 may be configured to perform point matching and screening operations based on the plurality of depth data sources.

Performing the fusion processing on the plurality of depth data sources may make it easier to identify points with relatively low matching qualities, such that the efficiency of generating a 3D point cloud may be improved.

In some embodiments, the processing unit 620 may be configured to determine, according to a first image data source in the plurality of image data sources, one or more initial parameters for processing a second image data source in the plurality of image data sources; and to process the second image data source according to the one or more initial parameters.

An initial parameter obtained based on the first image data source may be closer to the true value, such that the 3D point cloud can be generated more quickly and accurately.

In some embodiments, the first image data source may include an image data source obtained by a depth camera, and the second image data source may include an image data source obtained by a binocular camera.

The processing unit 620 may be configured to determine an initial feature point correspondence for processing the image data source obtained by the binocular camera according to the image data source obtained by the depth camera.

In some embodiments, the processing unit 620 may be configured to determine a depth of the feature point according to the image data source obtained by the depth camera, to determine a parallax of the feature point with respect to the binocular camera according to the depth of the feature point, and to determine an initial feature point correspondence according to the parallax of the feature point for the binocular camera.

In some embodiments, the processing unit 620 may be configured to determine a correspondence of the feature points of two images obtained by the binocular camera at the same time according to the initial feature point correspondence, to determine parallax information according to the correspondence of the feature points of the two images, to determine depth information according to the parallax information, and to generate a 3D point cloud according to the depth information.

In some embodiments, the first image data source may include a camera position and attitude data source, and the second image data source may include a depth data source.

The processing unit 620 may be configured to determine initial camera position and attitude for performing fusion processing on the depth data source according to the camera position and attitude data source.

In some embodiments, the processing unit 620 may be configured to determine camera position and attitude corresponding to depth data in the depth data source according to the initial camera position and attitude; and to fuse, according to the determined camera position and attitude, the depth data in the depth data source to obtain a 3D point cloud.

In some embodiments, the first image data source may include a camera position and attitude data source, and the second image data source may include an image data source obtained by a monocular camera.

The processing unit 620 may be configured to determine initial camera position and attitude for performing point cloud modeling on the image data source obtained by the monocular camera according to the camera position and attitude data source.

In some embodiments, the processing unit 620 may be configured to construct a point cloud model using the image data source obtained by the monocular camera according to the initial camera position and attitude.

Figure 7:
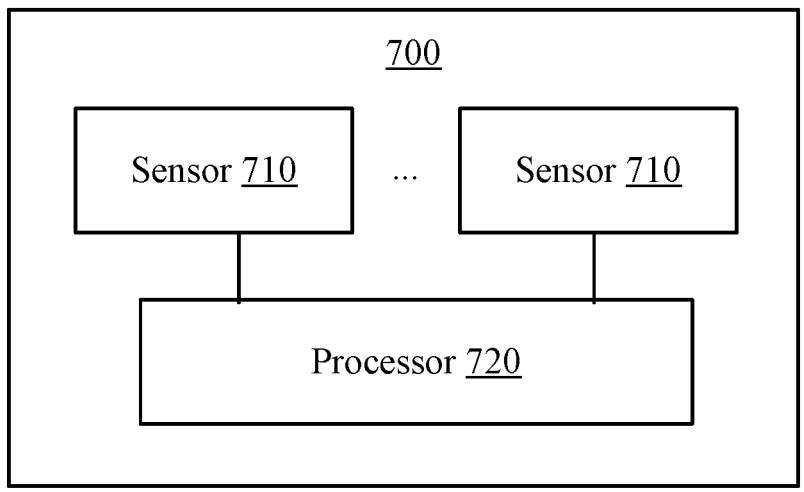
FIG. 7 illustrates a block diagram of an exemplary mobile apparatus according to various disclosed embodiments of the present disclosure.

FIG. 7 illustrates a block diagram of an exemplary mobile apparatus 700 according to various disclosed embodiments of the present disclosure. The mobile apparatus 700 may include, for example, a drone, i.e., an unmanned aerial vehicle (UAV), an unmanned vessel, a robot, or the like.

As shown in FIG. 7, the mobile apparatus 700 includes a plurality of sensors 710 configured to obtain a plurality of image data sources, and a processor 720 configured to perform fusion processing based on the plurality of image data sources to obtain a 3D point cloud.

As described above, the plurality of sensors 710 are arranged on the mobile apparatus 700 to obtain the plurality of image data sources. The plurality of image data sources may be used to generate the 3D point cloud. Compared to the conventional technologies in which only a single image data source is used, a method consistent with the disclosure has a larger amount of data because multiple image data sources are used. Further, the plurality of image data sources may reference to each other in the fusion processing, such that an efficiency of generating the 3D point cloud can be improved.

In some embodiments, the plurality of sensors 710 may include at least two of a depth camera, a binocular camera, a monocular camera, or a position angle sensor.

In some embodiments, the processor 720 may be configured to perform fusion processing on the plurality of depth data sources in the plurality of image data sources to obtain the 3D point cloud.

In some embodiments, the processor 720 may be configured to perform point matching and screening operations based on the plurality of depth data sources.

In some embodiments, the processor 720 may be configured to determine, according to a first image data source in the plurality of image data sources, one or more initial parameters for processing a second image data source in the plurality of image data sources; and to process the second image data source according to the one or more initial parameters.

In some embodiments, the first image data source may include an image data source obtained by a depth camera, and the second image data source may include an image data source obtained by a binocular camera.

The processor 720 may be configured to determine, according to the image data source obtained by the depth camera, an initial feature point correspondence for processing the image data source obtained by the binocular camera.

In some embodiments, the processor 720 may be configured to determine the depth of the feature point according to the image data source obtained by the depth camera, to determine a parallax of the feature point with respect to the binocular camera according to the depth of the feature point, and to determine the initial feature point correspondence according to the parallax of the feature point for the binocular camera.

In some embodiments, the processor 720 may be configured to determine a correspondence of the feature points of two images obtained by the binocular camera at the same time according to the initial feature point correspondence, to determine parallax information according to the correspondence of the feature points of the two images, to determine depth information according to the parallax information, and to generate a 3D point cloud according to the depth information.

In some embodiments, the first image data source may include a camera position and attitude data source, and the second image data source may include a depth data source.

In some embodiments, the processor may be configured to determine initial camera position and attitude for performing fusion processing on the depth data source according to the camera position and attitude data source.

In some embodiments, the processor 720 may be configured to determine camera position and attitude corresponding to depth data in the depth data source according to the initial camera position and attitude; and to fuse the depth data in the depth data source according to the determined camera position and attitude to obtain a 3D point cloud.

In some embodiments, the first image data source may include a camera position and attitude data source, and the second image data source may include an image data source obtained by a monocular camera.

In some embodiments, the processor 720 may be configured to determine initial camera position and attitude for performing point cloud modeling on the image data source obtained by the monocular camera according to the camera position and attitude data source.

In some embodiments, the processor 720 may be configured to construct a point cloud model using the image data source obtained by the monocular camera according to the initial camera position and attitude.

Figure 8:
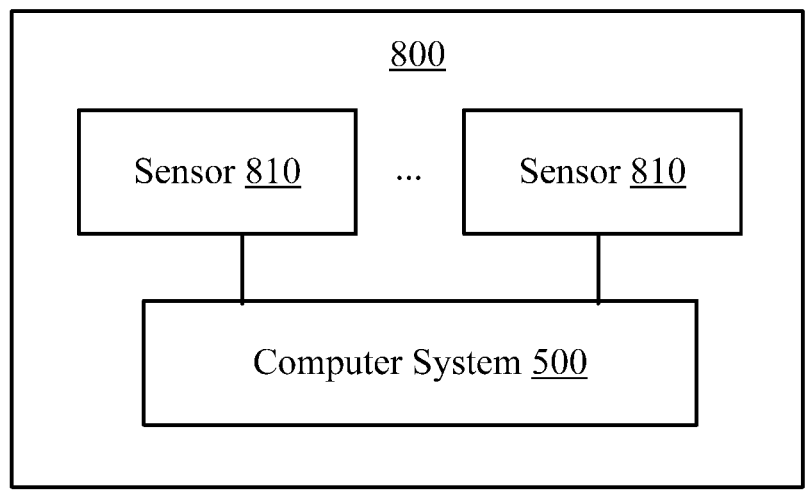
FIG. 8 illustrates a block diagram of another exemplary mobile apparatus according to various disclosed embodiments of present disclosure.

FIG. 8 illustrates a block diagram of another exemplary mobile apparatus 800 according to various disclosed embodiments of present disclosure. The mobile apparatus 800 may include, for example, a drone, i.e., an unmanned aerial vehicle (UAV), an unmanned vessel, a robot, or the like.

As shown in FIG. 8, the mobile apparatus 800 includes a plurality of sensors 810 configured to obtain a plurality of image data sources, and the computer system 500.

The computer system 500 may obtain the plurality of image data sources obtained by the plurality of sensors 810, and may perform fusion processing according to the plurality of image data sources to obtain a 3D point cloud.

Figure 9:
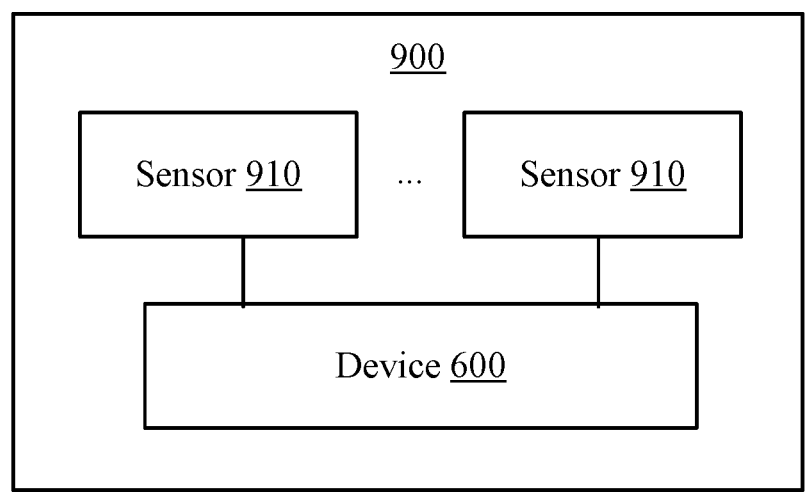
FIG. 9 illustrates a block diagram of another exemplary mobile apparatus according to various disclosed embodiments of the present disclosure.

FIG. 9 illustrates a block diagram of another exemplary mobile apparatus 900 according to various disclosed embodiments of the present disclosure. The mobile apparatus 900 may include, for example, a drone, an unmanned vessel, a robot, or the like.

As shown in FIG. 9, the mobile apparatus 900 includes a plurality of sensors 910 configured to obtain a plurality of image data sources, and the device 600 configured to generate the 3D point cloud.

In the present disclosure, the computer system, and the device and the mobile apparatus for generating the three-dimensional point cloud may correspond to the execution body of the method for generating the 3D point cloud according to the embodiments of the present disclosure. Further, the above-described and other operations and/or functions of the modules in the computer system, and the device and the mobile apparatus for generating the 3D point cloud are for achieving the corresponding processes of the above-described methods, the descriptions of which are not repeated here.

The present disclosure provides a method, a device, a computer system, and a mobile apparatus for generating a three-dimensional point cloud. The method may include obtaining a plurality of image data sources through a plurality of sensors, and performing fusion processing according to the plurality of image data sources to obtain a three-dimensional point cloud. The method, device, computer system and mobile apparatus for generating a three-dimensional point cloud consistent with the disclosure may efficiently generate a three-dimensional point cloud.

The present disclosure also provides a computer storage medium. The computer storage medium may store program codes for instructing the execution of the method for generating a 3D point cloud consistent with the disclosure, such as any one of the above-described exemplary methods for generating a 3D point cloud.

The term "and/or" includes any suitable combination of one or more related items listed. In addition, the character "/" may generally indicate that the associated objects may have an "or" relationship.

Those of ordinary skill in the art will appreciate that the exemplary elements and algorithm steps described above can be implemented in electronic hardware, or in a combination of computer software and electronic hardware. Whether these functions are implemented in hardware or software depends on the specific application and design constraints of the technical solution. One of ordinary skill in the art can use different methods to implement the described functions for different application scenarios, but such implementations should not be considered as beyond the scope of the present disclosure.

For simplification purposes, detailed descriptions of the operations of exemplary systems, devices, and units may be omitted and references can be made to the descriptions of the exemplary methods.

The disclosed systems, apparatuses, and methods may be implemented in other manners not described here. For example, the devices described above are merely illustrative. For example, the division of units may only be a logical function division, and there may be other ways of dividing the units. For example, multiple units or components may be combined or may be integrated into another system, or some features may be ignored, or not executed. Further, the coupling or direct coupling or communication connection shown or discussed may include a direct connection or an indirect connection or communication connection through one or more interfaces, devices, or units, which may be electrical, mechanical, or in other form.

The units described as separate components may or may not be physically separate, and a component shown as a unit may or may not be a physical unit. That is, the units may be located in one place or may be distributed over a plurality of network elements. Some or all of the components may be selected according to the actual needs to achieve the object of the present disclosure.

In addition, the functional units in the various embodiments of the present disclosure may be integrated in one processing unit, or each unit may be an individual physically unit, or two or more units may be integrated in one unit.

A method consistent with the disclosure can be implemented in the form of computer program stored in a non-transitory computer-readable storage medium, which can be sold or used as a standalone product. The computer program can include instructions that enable a computer device, such as a personal computer, a server, or a network device, to perform part or all of a method consistent with the disclosure, such as one of the exemplary methods described above. The storage medium can be any medium that can store program codes, for example, a USB disk, a mobile hard disk, a read-only memory (ROM), a random access memory (RAM), a magnetic disk, or an optical disk.

Other embodiments of the disclosure will be apparent to those skilled in the art from consideration of the specification and practice of the embodiments disclosed herein. It is intended that the specification and examples be considered as exemplary only and not to limit the scope of the disclosure, with a true scope and spirit of the invention being indicated by the following claims.

What is claimed is:

1. A method of generating a three-dimensional point cloud, comprising:
    obtaining a plurality of image data sources through a plurality of sensors, and
    performing fusion processing according to the plurality of image data sources to obtain the three-dimensional point cloud,
    wherein performing the fusion processing according to the plurality of image data sources includes:
        determining, according to a first image data source in the plurality of image data sources, an initial parameter for processing a second image data source in the plurality of image data sources; and
        processing the second image data source according to the initial parameter.

2. The method according to claim 1, wherein obtaining the plurality of image data sources through the plurality of sensors includes obtaining the plurality of image data sources through at least two of a depth camera, a binocular camera, a monocular camera, or a position angle sensor.

3. The method according to claim 1, wherein performing the fusion processing further includes performing fusion processing on a plurality of depth data sources in the plurality of image data sources to obtain the three-dimensional point cloud.

4. The method according to claim 3, wherein performing the fusion processing on the plurality of depth data sources in the plurality of image data sources includes performing point matching and screening operations according to the plurality of depth data sources.

5. The method according to claim 1, wherein:
    the first image data source includes an image data source obtained by a depth camera, and the second image data source includes an image data source obtained by a binocular camera, and
    determining the initial parameter for processing the second image data source according to the first image data source includes determining an initial feature point correspondence for processing the image data source obtained by the binocular camera according to the image data source obtained by the depth camera.

6. The method according to claim 5, wherein determining the initial feature point correspondence for processing the image data source obtained by the binocular camera according to the image data source obtained by the depth camera includes:
    determining a depth of a feature point according to the image data source obtained by the depth camera;
    determining a parallax of the feature point with respect to the binocular camera according to the depth of the feature point; and
    determining the initial feature point correspondence according to the parallax of the feature point with respect to the binocular camera.

7. The method according to claim 5, wherein processing the second image data source according to the initial parameter includes:
    determining a correspondence of feature points of two images obtained by the binocular camera according to the initial feature point correspondence;
    determining parallax information according to the correspondence of the feature points of the two images;
    determining depth information according to the parallax information; and
    generating the three-dimensional point cloud according to the depth information.

8. The method according to claim 1, wherein:
    the first image data source includes a camera position and attitude data source, and the second image data source includes a depth data source, and
    determining the initial parameter for processing the second image data source according to the first image data source includes determining initial camera position and attitude for performing fusion processing on the depth data source according to the camera position and attitude data source.

9. The method according to claim 8, wherein processing the second image data source according to the initial parameter includes:
    determining camera position and attitude corresponding to depth data in the depth data source according to the initial camera position and attitude; and
    performing fusion processing on the depth data in the depth data source according to the camera position and attitude to obtain the three-dimensional point cloud.

10. The method according to claim 1, wherein:
    the first image data source includes a camera position and attitude data source, and the second image data source includes an image data source obtained by a monocular camera; and
    determining the initial parameter for processing the second image data source according to the first image data source includes determining initial camera position and attitude for performing point cloud modeling on the image data source obtained by the monocular camera according to the camera position and attitude data source.

11. The method according to claim 10, wherein processing the second image data source according to the initial parameter includes constructing a point cloud model using the image data source obtained by the monocular camera according to the initial camera position and attitude.

12. A mobile apparatus comprising:
    a plurality of sensors configured to obtain a plurality of image data sources; and
    a processor configured to perform fusion processing according to the plurality of image data sources to obtain a three-dimensional point cloud,
    wherein the processor is configured to:
    determine, according to a first image data source in the plurality of image data sources, an initial parameter for processing a second image data source in the plurality of image data sources; and
    processing the second image data source according to the initial parameter.

13. The mobile apparatus according to claim 12, wherein the plurality of sensors include at least two of a depth camera, a binocular camera, a monocular camera, or a position angle sensor.

14. The mobile apparatus according to claim 12, wherein the processor is further configured to perform fusion processing on a plurality of depth data sources in the plurality of image data sources to obtain the three-dimensional point cloud.

15. The mobile apparatus according to claim 12, wherein:
the first image data source includes an image data source obtained by a depth camera, and the second image data source includes an image data source obtained by a binocular camera, and
the processor is further configured to determine an initial feature point correspondence for processing the image data source obtained by the binocular camera, according to the image data source obtained by the depth camera.

16. The mobile apparatus according to claim 12, wherein:
the first image data source includes a camera position and attitude data source, and the second image data source includes a depth data source; and
the processor is further configured to determine initial camera position and attitude for performing fusion processing on the depth data source, according to the camera position and attitude data source.

17. The mobile apparatus according to claim 12, wherein:
the first image data source includes a camera position and attitude data source, and the second image data source includes an image data source obtained by a monocular camera, and
the processor is further configured to determine initial camera position and attitude for performing point cloud modeling on the image data source obtained by the monocular camera, according to the camera position and attitude data source.

18. The mobile apparatus according to claim 12, wherein the mobile apparatus is one of a drone, an unmanned vessel, or a robot.

* * * * *